3,363,992
CATALYTIC REACTION AND RECYCLE SYSTEM
Michael C. Chervenak, Pennington, N.J., assignor to Hydrocarbon Research, Inc., New York, N.Y., a corporation of New Jersey
Filed Oct. 20, 1965, Ser. No. 498,854
4 Claims. (Cl. 23—288)

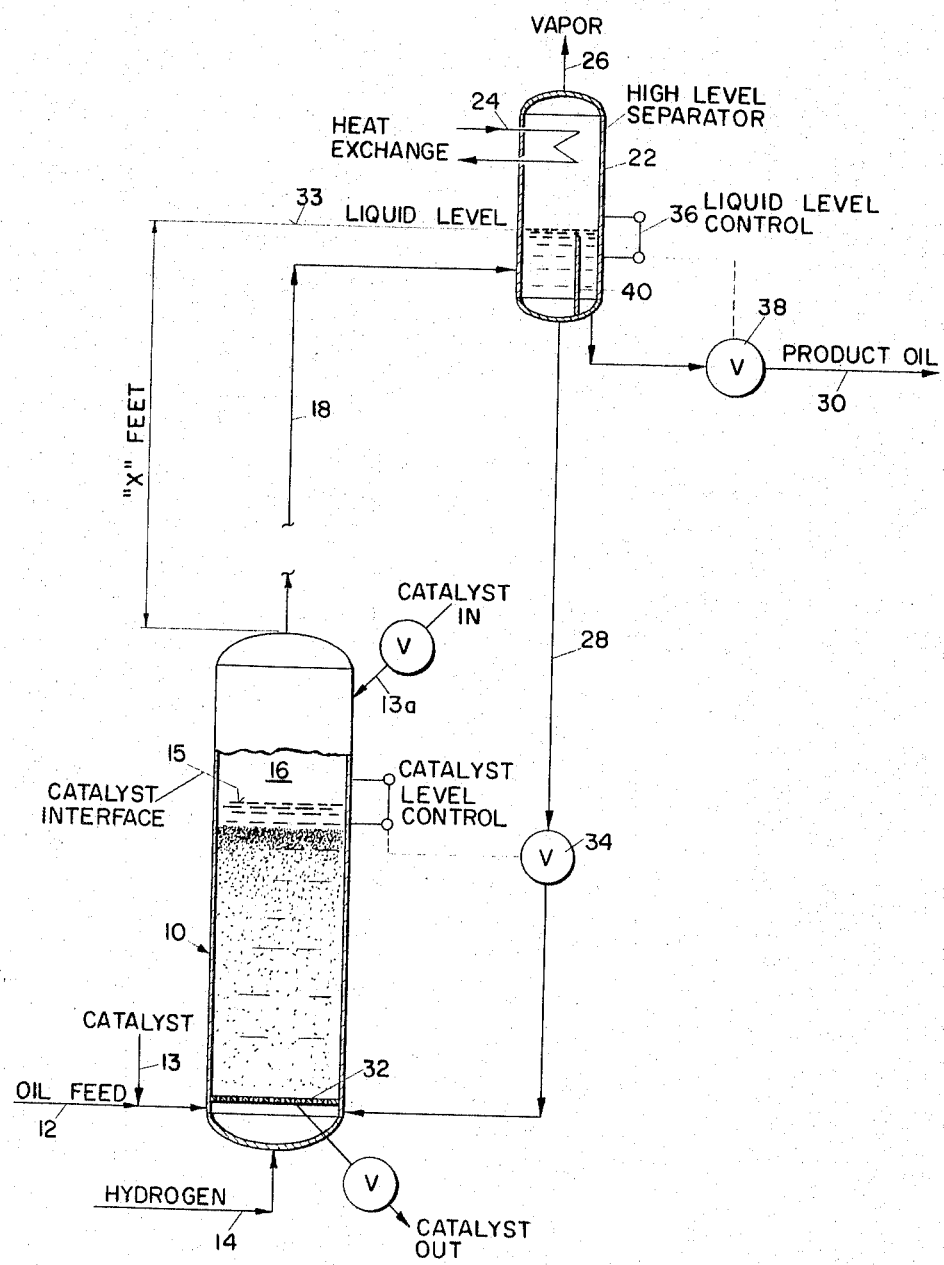

This invention relates to the multi-phase contacting of liquid-solids-gas systems and specifically the hydrogenation of liquids in the presence of catalysts, as for example, the hydrogenation of heavy residuum hydrocarbons for the purposes of hydrodesulfurization, hydrocracking or other.

In my prior patent, 2,987,468, reference has been made to the desirability of recirculating liquids from an upper part of a reactor to a lower part, not only for the purpose of completing the reaction but also for establishing an adequate upflow of liquid as will maintain the catalyst or other contact particles in random motion. This so-called "ebullated" bed system is more particularly described in the Johanson patent, 2,987,465, and is based on a suitable adjustment of the variables including the flow rate, density and viscosity of the liquid and gasiform material, and the size, shape and density of the particulate material, whereby it is possible to maintain the catalyst in random motion in the liquid with a resulting material improvement in operations. This improvement is not only in improved contact of the elements of the liquid-solids-gas system giving substantially isothermal operation but it also gives a minimum pressure drop and shows a substantial freedom from coke which tends to prevent other systems from operating for long periods of time.

In the prior practice of the ebullated bed inventions, it was found that circulation of liquid from an upper part of the reactor to a lower part of the reactor was, in some cases, as high as 30 times the feed rate. Such a recycle was thus accomplished by either an external pump system wherein liquid from the upper part of the reactor, at effluent conditions, was pumped, with or without heat exchange, back to the bottom or, alternatively, it was possible to utilize an internal recirculation system such as shown in the Garbo patent, 3,151,060. The internal system has some advantages in that the equipment requires no external connections to the reactor and there is no heat loss. Furthermore, in a system in which pressures are in the order of from 1500 to 5000 pounds per square inch gauge (p.s.i.g.) and temperatures are in the order of 700°–900° F., the very expensive external connections and piping are avoided.

A major maintenance problem, in either the internal or external circulating system, is the structural limitations of the pump. It is well known that pumps require various sealing devices which tend to leak. Pumps also require some form of driver and usually wherever a pump is used it can become a blockage in a system if the pump ceases to function. It has also been found that large volume pumps require substantial service and, in some cases, have caused premature shut down of an otherwise workable system. The presence of solids in the system adds to these problems.

It has been suggested in the prior art that circulation of liquid can be accomplished by a differential density in separate coextensive liquid columns and apparatus has been shown wherein a conduit within the reactor was intended to accomplish such internal circulation. This was based on the belief that a relatively light or less dense column of oil and gas (hydrogen) would be placed in motion by a more dense, substantially gas-free column of returning liquid. Experimental work has shown, however, that the net driving force due to the differential in density in such a system having catalyst in suspension is so low that on numerous occasions the flow of liquid sustaining the catalyst reversed which caused objectionable plugging and rendered the system inoperable.

It is, of course, known that in commercial refinery practice, runs of at least 330 days are customary before turn around. During such a run, some operating fluctuations are bound to happen and it is thus essential that a recycle system be controllable so that it is possible to get back on stream with a minimum loss of yield.

The specific purpose of my invention is to accomplish a high level positive controlled circulation of hydrocarbon oils through a catalytic reactor whereby uniform temperature and reaction conditions can be maintained and without requiring circulating pumps of any kind.

A further object of my invention is to provide a controllable recycle system which is adapted to the hydrogenation of hydrocarbons and which is based on maintaining a high level liquid reservoir the level in which may be controlled as desired to effect a positive recycle upflow through a liquid phase reactor having a substantial concentration of solids.

Further objects and advantages of the invention will appear from the following description of a preferred form of embodiment thereof taken in connection with the attached drawings illustrative thereof and in which the figure is a schematic flow diagram of a liquid recycle system for high pressure gas-liquid-solids contacting.

The reactor 10 indicated in the figure is similar to the reactor disclosed in the aforementioned patents and is intended to contain a catalyst for a reaction of oil feed at 12 with catalyst which may enter at 13 and 13a and hydrogen entering at 14. As previously mentioned, the velocity of the liquid and gas upwardly through the bed of catalyst is adapted to place the catalyst in random motion within the liquid without substantial carryover from the reactor. The catalyst usually forms an interface 15 in zone 16.

In accordance with my invention, the effluent vapors and liquid pass upwardly through the line 18 to a high level separator 22 having a liquid level at a distance of "X" feet above the top part of the reactor 10.

The separator 22 for a hydrogenation reaction can be provided with a heat exchange coil 24 suitably supplied with any desired cooling medium, as for example, the hydrogen or the oil feed, or a mixture thereof whereby a controlled temperature can be maintained for the condensing of liquid carried out in the effluent line 18. The net vapor is removed overhead at 26 and in a hydrogenation reaction will usually be treated to recover hydrogen for recycle. The liquid collected in separator 22 is returned in part as recycle by line 28 with a net product removed at 30.

This recycle leg 28 of the hydraulic loop is substantially entirely a dense phase liquid having a density which offsets the density of the liquid-gas-solids phase in the reactor 16 as well as the liquid-gas phase in riser 18. While there is some frictional resistance to overcome as in pipes 18 and 28 and through the bubble cap or distributor tray 32, it is found that where the extension pipe 18 establishes a liquid level 33 which is at a distance "X" of at least 1.25 and usually not above 4 times the reactor height, there is a driving force sufficient in a hydrocarbon hydrogenation system to recycle up to 9 times the amount of fresh liquid feed.

In a system of this type the variable factors which permit close control of the reaction is the temperature of the oil feed 12, the temperature of the incoming hydrogen 1, the cooling temperature at 24, and by means of the valve 34, the quantity of liquid recycle.

The liquid level 33 in the high level separator 22 is controllably maintained by a liquid level controller 36 which in turn controls product line flow valve 38. If desired, the high level separator 22 may have a transverse baffle 40 over which the product oil must flow whereby any possible solids carried overhead with the effluent in line 18 will settle out and can be recycled in line 28. Such a construction permits the use of very fine catalyst, i.e., of 30 mesh (Tyler) and smaller.

However, the catalyst contemplated for hydrogenation is normally of a size which will not rise above the catalyst level 15 so that the effluent in line 18 is substantially free of catalyst.

For the purpose of further explaining the nature of the invention, the following example is given solely for illustration:

To calculate the additional height needed to induce a flow of 60 gallons per minute per square foot of horizontal reaction space through the bubble cap tray 32 in the reaction zone 16, which is assumed to be 6 feet in diameter and making the further assumptions as follows:

| | |
|---|---|
| Height of reaction zone _____ft__ | 16 |
| Pressure drop across bubble cap tray ___lbs./sq. ft__ | 20 |
| Liquid-solids-gas density _____lbs./cu. ft__ | 60 |
| Liquid-gas density _____lbs./cu. ft__ | 20 |
| Liquid density _____lbs./cu. ft__ | 42 |
| Recycle ratio _____ | 9:1 |
| Superficial gas velocity (reactor) _____ft./sec__ | 0.1 |

Taking a pressure balance with the top of the downcomer cap on the bubble tray as a reference, it is established that the extra height required is 21 feet thus making the recycle conduit 28, 37 feet in effective height.

With a liquid of this type, under conditions of hydrogenation (temperatures in the order of 750–900° F. and pressure in the order of 1500–5000 p.s.i.g.), where a catalyst is present, the extra height of conduit 18 should be from 1.25 to 4.0 times the effective height of reaction zone 16 and usually 1.50 to 2.0 times such height is sufficient. For the particular liquid it is found that the conduit 18 should be of the order of one foot in diameter to provide the desired recycle capacity to ebullate the bed of catalyst. A sixteen inch line 18 is usually sufficient to carry the liquid and vapors of the effluent.

While I have shown a preferred form of embodiment of my invention, I am aware that further modifications may be made thereto within the scope and spirit of the description herein and of the claims appended hereinafter.

I claim:

1. A pumpless recycle system for the liquid phase contacting of a liquid with a second material from the class of solids and gas which system includes a contacting chamber having a liquid inlet to the lower part thereof, an effluent outlet from the upper part thereof and:
   (a) a high level separator above the contacting chamber and in communication with said effluent outlet,
   (b) means to maintain a liquid level in said separator,
   (c) means in said separator to separate the gas from the effluent,
   (d) a liquid recycle conduit extending from said separator to the lower part of the contacting chamber,
   (e) valve means in said recycle conduit to control the rate of flow of recycle liquid to said contacting chamber in the range of 1:1 to 1:9 based on liquid inlet,
   (f) said recycle conduit having an effective head X which is equal to from 1.25 to 4.0 times Y where Y is the effective height of the contacting chamber.

2. A pumpless recycle system as claimed in claim 1 having a vapor condensing heat exchanger in said separator to condense liquid from the effluent from the reactor.

3. A pumpless recycle system as claimed in claim 1 wherein said separator includes a solids separating baffle member.

4. A pumpless recycle system as claimed in claim 1 wherein the contacting chamber has a distributor tray above the inlet and is normally filled with solids and the cross section of the recycle conduit is in the order of $16^2/12^2$ of the cross section of the effluent outlet.

References Cited

UNITED STATES PATENTS

| | | | |
|---|---|---|---|
| Re. 25,770 | 4/1965 | Johanson | 208—143 |
| 3,183,180 | 5/1965 | Schuman et al. | 208—216 |

SAMUEL P. JONES, *Primary Examiner.*